Fig. 1

Oct. 28, 1930.  H. B. HULL  1,779,544
REFRIGERATING APPARATUS
Filed Aug. 5, 1925  7 Sheets-Sheet 2

Inventor
Harry B. Hull
By Spencer Duvall & Hardman
his Attorneys.

Inventor
Harry B. Hull
By Spencer Small & Hardman
his Attorneys

Patented Oct. 28, 1930

1,779,544

UNITED STATES PATENT OFFICE

HARRY B. HULL, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed August 5, 1925. Serial No. 48,280.

The present invention relates to refrigerating systems of the absorption type which are applicable particularly for household purposes, in which the different phases of operation automatically succeed one another in recurring cycles.

The present system includes a generator and absorber means, and a condenser and evaporator means operatively connected together. The generator and absorber means is adapted to be intermittently heated and intermittently cooled. During the heating phase of the means, when refrigerant is vaporized and conducted to the condenser, the condenser is subjected to a cooling medium to condense the vaporized refrigerant. One object of the present invention is to provide for the safety of the system by preventing an excessive pressure within the system. One manner of carrying out this object is to stop the heating phase when the flow of cooling medium is obstructed.

Another object of the invention is to provide a simple construction for controlling the intermittent flow of cooling medium to the generator and absorber means, and to the evaporator of the system.

A further object is to provide a simple construction for intermittently starting the heating phase and intermittently starting the cooling phase of the generator and absorber means. One manner of carrying out this object is to control these phases through the cooling-medium-circulating system by controlling the flow of cooling medium.

A still further object is to provide for the efficient operation of the system. In carrying out this object, means are provided for restricting the flow of cooling medium when a relatively large quantity of cooling medium is not necessary.

A still further object is to embody the entire system in a compact unit which can be mounted on a wall of a cabinet with the cooling unit contained within the cabinet.

Another object is to automatically return absorbent, which is carried from the generator and absorber means with the vaporized refrigerant, to said means.

Further objects and advantages of the present invention will be apparent from the following description, reference being had to the accompanying drawings, wherein a preferred form of the present invention is clearly shown.

In the drawings:

Fig. 9 shows a fragmentary sectional view of the generator-absorber, showing the controller of the system in elevation.

Figs. $9^a$, $9^b$, $9^c$, and $9^d$ are fragmentary views taken on lines $9^a$—$9^a$, $9^b$—$9^b$, $9^c$—$9^c$ and $9^d$—$9^d$, respectively, of Fig. 9.

Fig. 10 is a view similar to Fig. 9, showing the controller in another position.

Referring to the drawings, there is shown a generator-absorber 20 containing an absorbent 21. A cooling device for the absorbent includes a coil 22 submerged in the absorbent and adapted to contain a cooling medium. A heating device for the generator-absorber 20 includes a gas burner 23 which is controlled by the gas valve 24. The generator-absorber 20 is arranged to be intermittently heated by the heating device and intermittently cooled by the cooling device, and these phases of operation are automatically controlled by a controller 25 whereby the system is operated in recurring cycles. During the heating phase of the generator-absorber 20, vaporized refrigerant is conducted through a dehydrator 27 comprising two parallel coils 28 and 29 and through a non-return valve 30, pipe 31, to a condenser 32 comprising a coil which is contained in a tank 33 containing a cooling medium 34. The condensed refrigerant is conducted through a pipe 35 to the cooling unit 37. The cooling unit includes a header 38 which receives the condensed refrigerant and from which is suspended a brine tank 39. Brine tank 39 receives an ice-tray sleeve 40 for an ice tray 41.

During the cooling phase of the generator-absorber 20, vaporized refrigerant is conducted from the container 38 through pipe 35, condenser 32, pipe 31, a non-return valve 43, and pipe 44, which pipe has its outlet, including a plurality of orifices 45, located below the level of absorbent within the generator-absorber. A conduit 47 is connected between the container 38 and the generator-absorber 20 and has its inlet 48 located at a relatively low level within the container 38. This conduit is utilized for conducting absorbent, which is carried from the generator-absorber to the container 38 with the vaporized refrigerant, to the generator-absorber. A valve 49 is included in conduit 47 and controls the flow of absorbent therethrough in accordance with the pressure within the refrigerating system.

Referring more in detail to the drawings, a base 50 is carried by the top 51 of a refrigerator cabinet 52. Supporting brackets 53 are carried on the rear of the base 50 and support the generator-absorber 20 in spaced relation with the base 50 in which space the burner 23 is located. The generator-absorber 20 is cylindrical in shape and the upper portion is provided with a projection 54 to which the dehydrator coils 28 and 29 are connected. The dehydrator coils are connected with the valve 30 by a pipe 55 which is connected with a chamber 56 of the valve 30. Valve 30 includes a second chamber 57 located below the chamber 56 and contains a quantity of mercury 58. The pipe 59 connects chamber 56 and chamber 57, the outlet of said pipe being located below the level of mercury 58. The outlet of valve 30, which is connected with pipe 31, is located above the mercury within the chamber 57.

The base 50 also supports the condenser tank 33. A water pipe 61 conveys water to the container 33, the water passing through a valve 62 which is controlled by a float 63. The outlet of the tank 33 is connected adjacent its lower end with a pipe 65. The tank 33 is connected with an overflow pipe 66 through which water may flow in case the valve 62 does not function correctly and permits the excessive amount of water to flow from the tank 33.

The top of the cabinet 51 has an opening 68 for receiving a box-like member 69 containing insulating material 70. The bottom of member 69 supports the cooling unit 37 by brackets 70ª. Member 69 is supported by the base 50 and the pipe 35, leading from the condenser 32 to the container 38 of the unit 37; and the conduit 47, which is connected with container 38 and the valve 39, extends through the box-like member 69.

Figure 1:
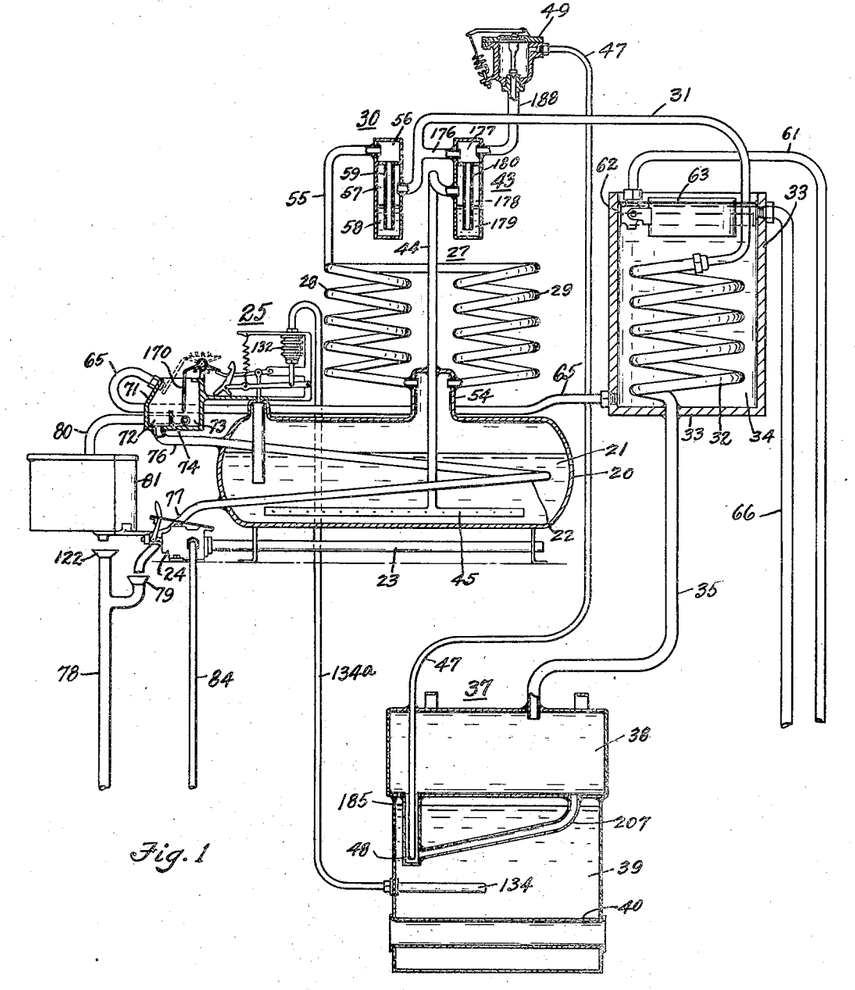
Fig. 1 is a diagrammatic view of the improved refrigerating system.
Figure 2:
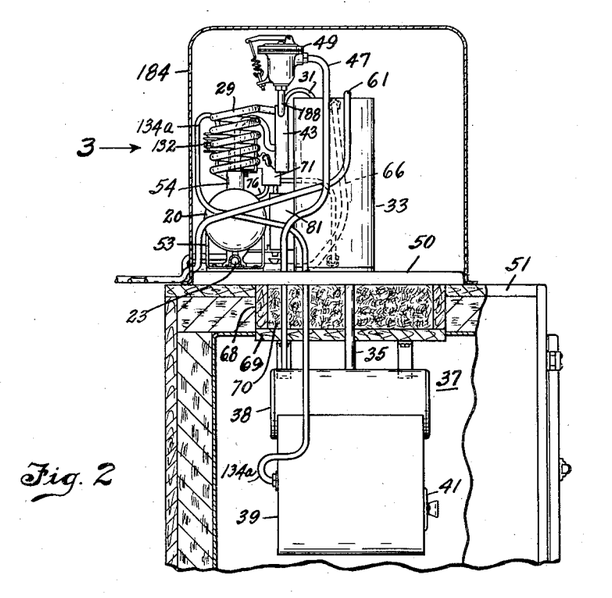
Fig. 2 is a view showing the refrigerating unit in elevation and showing same in position in a refrigerating cabinet, a portion of the cabinet being shown in section and the view being taken looking in the direction of arrow 2 in Fig. 3.
Figure 3:
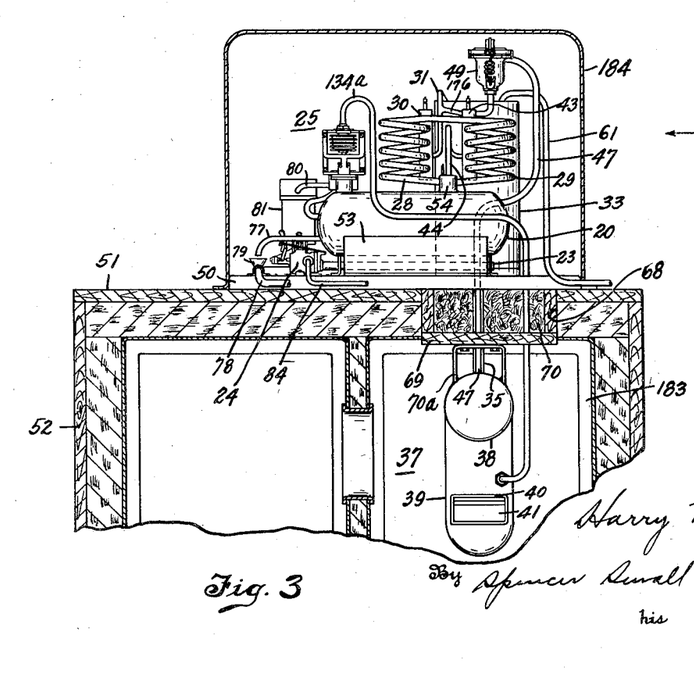
Fig. 3 is a view showing the unit in elevation and the cabinet in section, the view being taken looking in the direction of arrow 3 of Fig. 2.
Figure 4:
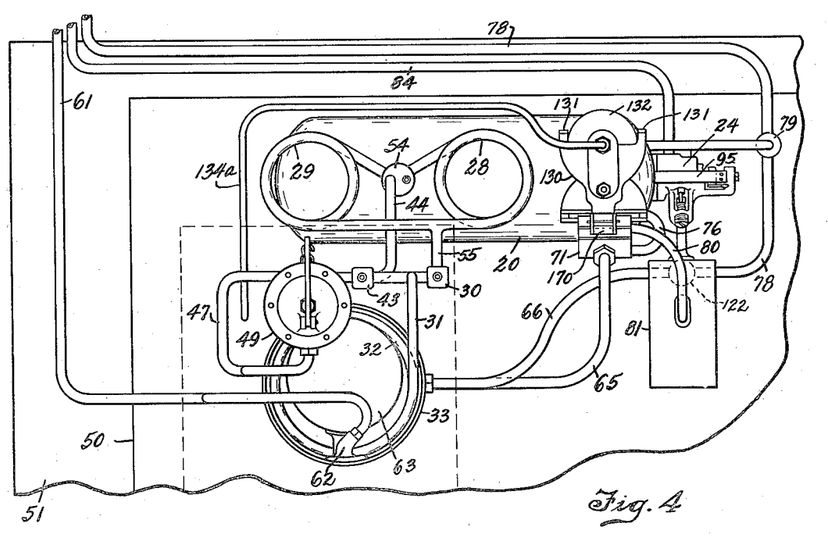
Fig. 4 is a top plan view of the unit.
Figure 5:
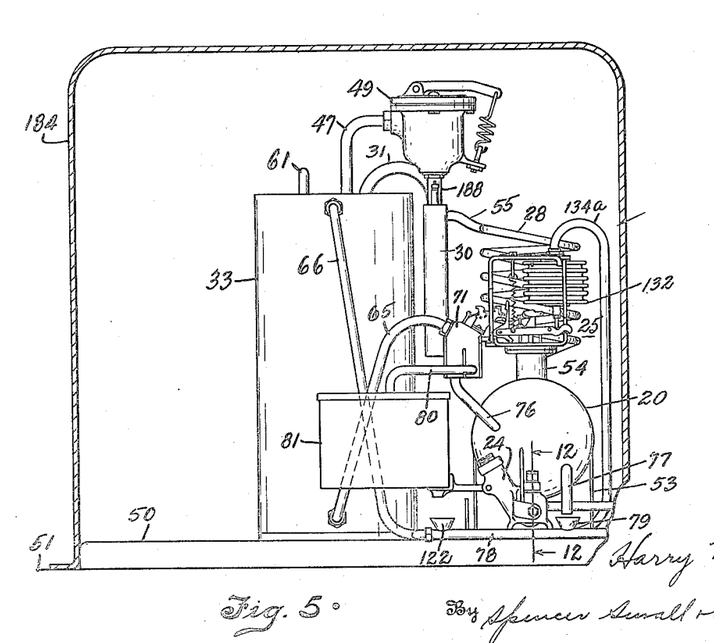
Fig. 5 is a view of the upper portion of the unit, the view showing the opposite side of that shown in Fig. 2.
Figure 6:
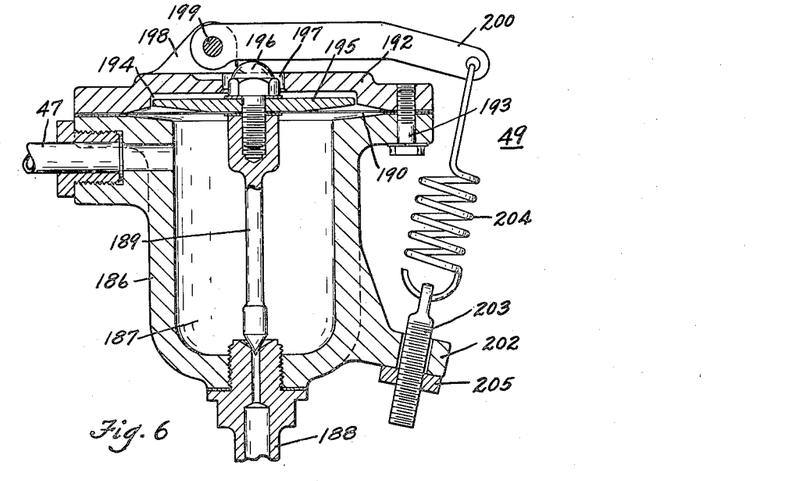
Fig. 6 is a sectional view of one of the valves used in the system.
Figure 7:
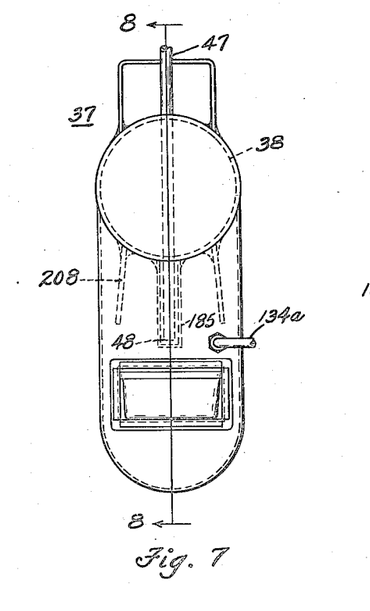
Fig. 7 is a view in elevation, showing the rear of the cooling unit of the system.
Figure 8:
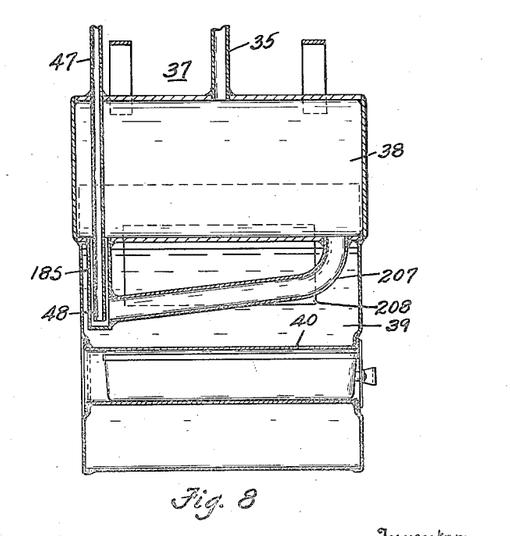
Fig. 8 is a sectional view taken on line 8—8 of Fig. 7.
Figures 9, 9A, 9C:
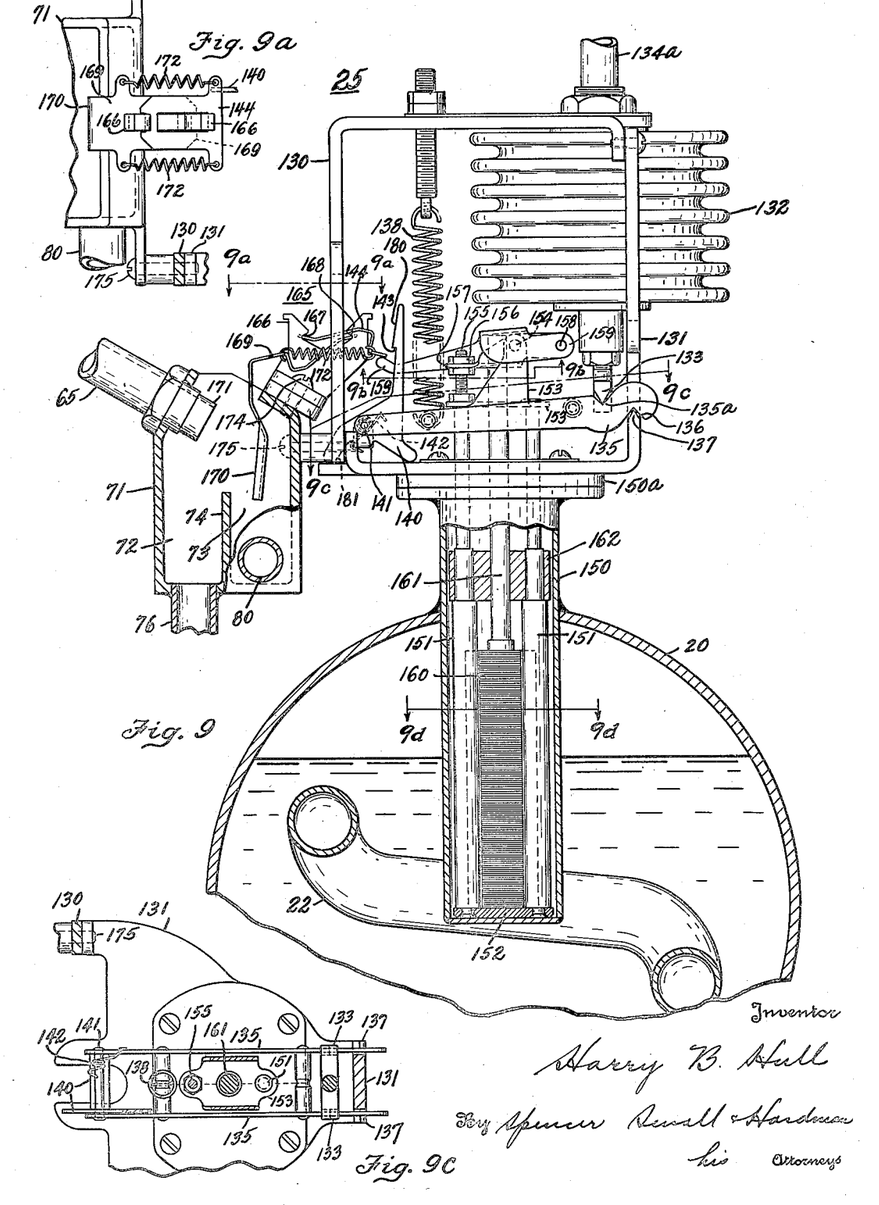
Figures 9B, 9D, 10:
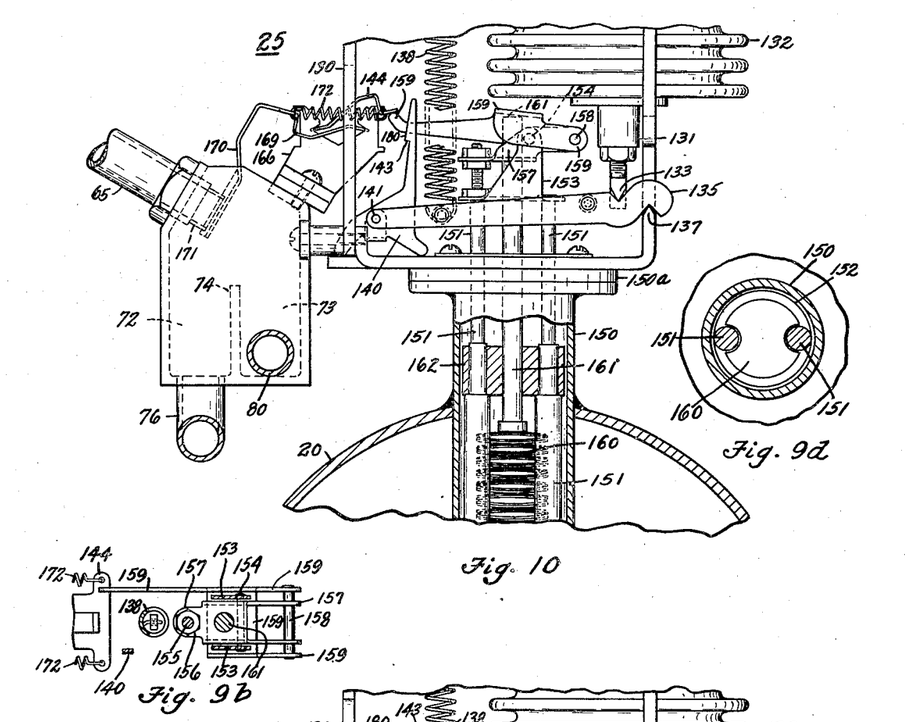
Figure 11:
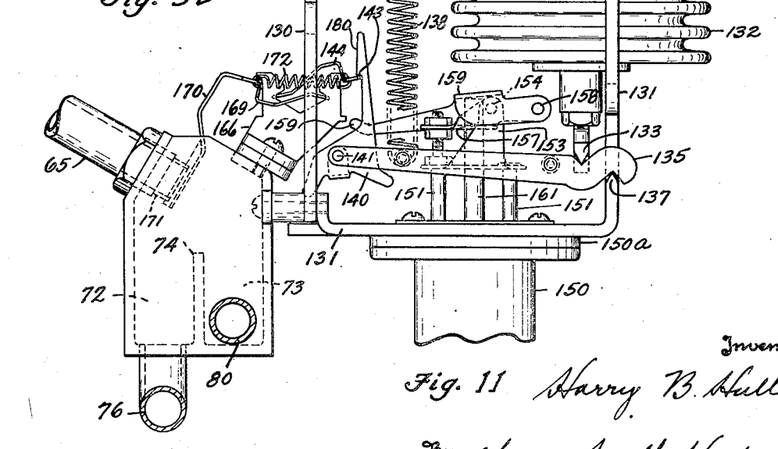
Fig. 11 is a view similar to Fig. 9, showing the controller in a still further position.

Referring particularly to Figs. 9, 10 and 11, the controller for intermittently operating the heating device 23, and intermittently operating the cooling device 22, includes a receptacle 71 having two compartments 72 and 73 separated from one another by a wall 74. The end of pipe 65, leading from the condenser tank 33, is carried by the receptacle 71, and water is adapted to flow from the tank 33 through the pipe 65 to either compartment 72 or 73. Water from the compartment 72 flows by way of pipe 76 to the cooling coil 22, which in turn is connected through a pipe 77 with a drain pipe 78 (see Figs. 1 and 5); the water flowing from the pipe 77 into a funnel-shaped member 79 which is connected with a drain pipe 78. Therefore, when water flows into compartment 72 of receptacle 71, the cooling device for the generator-absorber will be rendered operable.

Figures 12, 13:
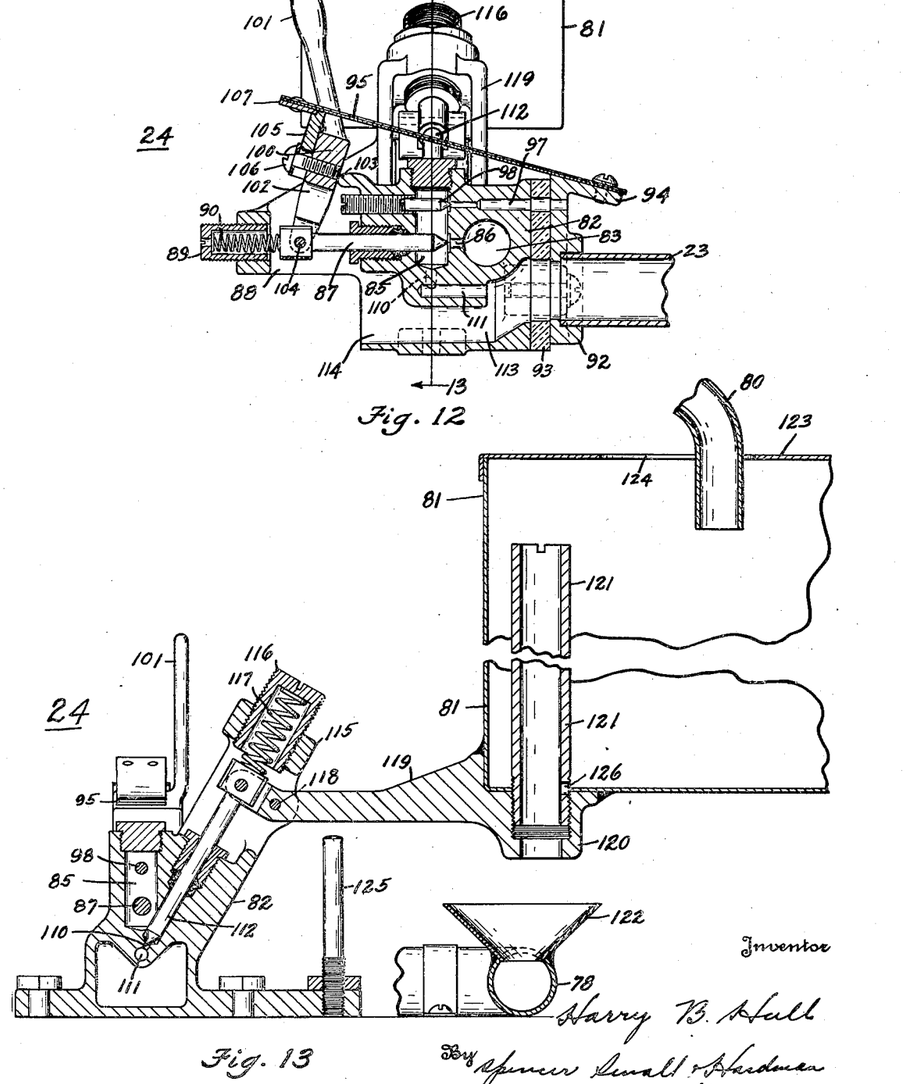
Fig. 12 is a sectional view of one of the valves, the section being taken on line 12—12 of Fig. 5.
Fig. 13 is a sectional view taken on line 13—13 of Fig. 12.

When water flows into compartment 73 of receptacle 71, it will be conducted by a pipe 80 into a movable receptacle 81. The movement of the receptacle 81 will cause the gas valve 24 to be actuated to permit gas to flow to the burner 23. Referring to Figs. 12 and 13, the gas valve 24 includes a body 82 having a horizontally-disposed chamber 83 which is connected with the gas inlet pipe 84. A vertically-disposed chamber 85 is connected with the main gas chamber 83 through a passage 86. This passage is controlled by a needle valve 87. The valve body 82 includes a yoke portion 88 carrying an adjustable plug 89. A spring 90 is interposed between the plug and the needle valve 87 and normally tends to maintain the valve in position to close intercommunication between the chamber 83 and the chamber 85. The burner 23 is secured to a plate 92 which in turn is secured to the valve body 82. A gasket 93 is interposed between plate 92 and body 82. Plate 92 is provided with an ear 94 which carries a bimetal thermostatic strip 95 including metals having different coefficients of expansion. The valve body 82, the gasket 93 and the plate 92 are provided with an aligned passage 97 which connects with the vertically-disposed chamber 85. This passage is controlled by an adjustable needle valve 98. Gas can flow from the chamber 83, through the passage 86, chamber 85 and chamber 97 when the needle valve 98 is open. The gas flowing through this passage is burned underneath the ear 94 and maintains same heated, and the flame provides a pilot for the burner 23. A hand-operated lever 100 having a handle 101 and a bifurcated portion 102 is pivotally mounted on the valve body 82. An ear 103 formed by the valve body, forms a fulcrum for the lever 100. A pin 104 is secured to needle valve 87, upon which the prongs of the bifurcated member 102 are carried. A latch 105 is attached by a screw 106 to the lever 100, the screw passing through a notch in latch 105 to permit adjustment thereof. The end of the bimetal strip 95 carries a latch member 107 adapted to cooperate with the latch 105 whereby to hold the lever in such a position that the valve 87 is open. The heat of the pilot light, which is directed against the ear 94, is conducted to the bimetal strip 95; and, as long as the pilot light is burning, the bimetal strip will assume such a position as to maintain the latch member 107 in engagement with the latch 105, whereby to maintain the gas valve 87 open. If for some cause or other, no gas enters the chamber 83, the pilot light will be extinguished. When the pilot light is extinguished, the bimetal strip 95 will cool and move upwardly, whereby the latch member 107 will move away from the latch 105 and the spring acting upon the needle valve 87 will move the said valve to close the passage between chamber 83 and chamber 85. In this manner, should the gas again be turned on, it will not be permitted to escape.

The vertically-disposed gas chamber 85 is connected with a passage 110, which in turn is connected with a horizontal passage 111. The flow of gas through the passage 110 is controlled by a needle valve 112. Passage 111 leads to a mixing chamber 113 connecting to atmosphere at 114. Valve body 82 is provided with a yoke 115 carrying a screw-threaded plug 116. A spring 117 is disposed between the head of plug 116 and the head of needle valve 112, and normally tends to hold the valve in position to close communication between the gas chamber 85 and passage 111. The sides of yoke portion 88 carry a pin 118 on which a lever 119 is pivotally mounted. One end of the lever 119 is connected with the valve 112 while the other end carries the movable receptacle 81. When receptacle 81 contains a predetermined quantity of water, it will overcome the resistance offered by spring 117 and move valve 112 to such position as to establish communication between the gas chamber 85 and the mixing chamber 113. Below the container 81, the lever 119 is provided with a hollow boss 120, which is screw-threaded to receive a pipe 121. This pipe extends upwardly within the container 81 and above the level which is necessary to provide for opening the valve 112. Pipe 121 provides an overflow for the receptacle 81, and the water flowing through this pipe passes into a funnel-shaped member 122 connected with the drain pipe 78. The top 123 of receptacle 81 is provided with an air opening 124 to receive pipe 80.

Thus it will be seen that water flowing into the compartment 73 of receptacle 71 will flow through the pipe 80 into receptacle 81, and when a predetermined quantity of water is contained within this receptacle, valve 112 will be actuated to permit the flow of gas from the chamber 85 to the mixing chamber 113. This gas within the mixing chamber 113 will flow into the burner 23 and will be ignited by the pilot light, which in turn will heat the absorbent and refrigerant within the generator-absorber. A stud 125 carried by the valve body 82 lies in the path of movement of lever 119 and limits the downward movement of said lever 119 and container 81. The pipe 121 within the container 81 is provided with a restricted opening 126 for draining the container 81 whereby when water ceases to flow through the compartment 73, water may drain from the container 81. After a predetermined quantity of water is drained from the container 81, the spring 117 will overcome the weight of the water within the container 81 and rotate the lever 119 to close the valve 112, thus stopping the flow of gas through the burner. The passage 126 in the pipe 121 is located adjacent the bottom of the container 81, and the size of this passage can be increased or decreased, as is necessary, by screwing the pipe 121 upwardly or downwardly, respectively.

Referring particularly to Figs. 9, 10 and 11, the controller 25 controls the flow of water to the compartments 72 and 73, and comprises a frame including two L-shaped members 130 and 131. Member 130 carries a metallic bellows 132 which is connected by a pipe 134ª with a bulb 134 located within the brine 39 of the cooling unit 37. This bulb contains a quantity of volatile liquid and is adapted to cause expansion and contraction of the bellows 132 in accordance with the temperature of the brine. The lower end of the bellows 132 carries a knife-bearing 133 which cooperates with a V notch 135ª in a lever 135. Lever 135 is provided with a second V notch 136 which receives a knife-bearing 137 formed by the frame member 131. One end of a spring 138 is attached to the lever 135 and the other end thereof is adjustably attached to the member 130 and normally tends to pull the lever upwardly to collapse the metallic bellows 132. A dog 140 is pivotally carried on the end of member 135 by pin 141. A spring 142 is wound around the pin 141, engages the dog 140 and tends to move the upper end of the dog to the left, as viewed in Fig. 9. The upper end of the dog 140 has a shoulder 143 which is arranged to cooperate with an arm 144 of a trip mechanism, to be described.

A tube 150 projects through the top portion of the generator-absorber 20 and has its lower end immersed within the absorbent 21 in the generator-absorber. The top of this tube carries the frame member 150ª. A plurality of posts 151 are located within the tube 150 and engage the bottom wall 152 of said tube. The upper ends of these posts carry a clip 153 having a pivot pin 154. The upper end of one of the posts 151 is screw-threaded, as at 155, to receive nuts 156, between which there is mounted a bracket 157 pivoted on pin 154. The bracket 157 carries a pin 158 and nuts 156 can be raised or lowered so as to raise and lower pin 158. A lever 159 is pivotally mounted upon the pin 158, and is arranged to engage the arm 144 of the trip mechanism.

A plurality of bimetal plates 160, each of which includes metals of different coefficient of expansion and which like metals of each are placed against one another, are contained within the tube 150 and are held in position by the posts 151. A rod 161 abuts the top of bimetal plate 160 and engages the yoke of lever 159 for moving said lever upwardly. The posts 151 maintain a guide 162 in position, which guide maintains the rod 161 in operative relation with respect to the lever 159 and the plates 160.

The trip mechanism 165 includes a frame 166 having V-shaped notches 167 and 168 which receive arms 144 and 169, respectively. Arm 169 includes baffle 170 formed integrally therewith, which baffle cooperates with a nozzle 171 formed by the end of pipe 65. A spring 172 is connected with the arms 144 and 169. The arm 144 is arranged to be moved upwardly by the lever 159, and after said arm is moved a predetermined distance upwardly, it will cause the arm 169, and likewise the baffle 170, to be moved from the position shown in Fig. 9 to the position shown in Fig. 10, by the spring 172. The entire trip mechanism is secured by screw 174 to the receptacle 71, and the receptacle 71 is carried by the frame 130 secured thereto by screw 175. When the baffle 170 is in the position shown in Fig. 9, water from the pipe 65 will flow over the wall 74 and into the compartment 73 which leads to the movable receptacle 81. When the baffle is in the position shown in Fig. 10, it will lie close to the nozzle 171 to restrict the flow of water therethrough, and likewise cause the water to flow into the compartment 72 which leads to the cooling coils 22 and the generator-absorber.

The operation of the device is as follows: Fig. 9 shows the control apparatus in condition for starting the heating of the generator-absorber. The temperature of the evaporator has increased to a degree causing the pressure in bellows 132 to increase to a point where the lever 135 has been moved into the position shown in Fig. 9. During movement of lever 135 into this position it has caused the shoulder 143 to engage the arm 144 to move the baffle 170 into the position shown in Fig. 9. Water flowing from the water container of the condenser will go through the pipe 65, nozzle 171, and into compartment 73, thus causing water to flow into the movable receptacle 81 and actuating the needle valve 112, whereby the burner 23 will be lighted. When this occurs, the absorbent and refrigerant within the generator-absorber will be heated and the vaporized refrigerant will pass through the dehydrator 27, pipe 55 and into chamber 56 of the valve 30. Pressure within the system will cause the refrigerant to be forced through the pipe 59 and into the mercury 58. Refrigerant will bubble through the mercury 58 and pass from the valve 30 into the pipe 31 which leads to the condenser 32. The condensed refrigerant will pass through the condenser 32 through pipe 35 into the container 38. This phase of operation will continue until a substantial part of the refrigerant is driven from the absorbent, at which time the absorbent will be heated to such a degree as to cause the bimetal plates 160, within the tube 150, to bend to such a degree as to move the rod 161 to such a distance that the lever 159 will move the arm 144, whereby the arm 169, and likewise baffle 170, will be actuated and will assume the position shown in Fig. 10.

When the baffle is in the position shown in Fig. 10, water from the nozzle 171 will flow into the compartment 72, whence it will flow through pipe 76 to the cooling coil 32, cooling the absorbent. When no water is flowing into the movable container 81, the water within said container will drain through the passage 126 in the pipe 121, whereby the needle valve 112 will be actuated to render the burner inoperative. The cooling of the generator-absorber will cause refrigeration to take place within the evaporator container 38,—the gas passing from said container through the pipes 35, condenser 32, pipe 31, branch pipe 176 to the chamber 177 of the non-return valve 43, which is constructed substantially the same as the non-return valve 30 and includes a second chamber 178 containing a quantity of mercury 179; and is connected by a pipe 180 with the chamber 177, which pipe has an outlet immersed in the mercury 179. Refrigerant passing through the valve 43 will pass from the outlet of the valve which is located above the level of mercury therein and flow to the pipe 44, whence it passes through the orifices 45 into the absorbent within the generator-absorber 20.

The evaporator is first cooled by the expansion of refrigerant therein so that the bellows 132 will contract to move the lever 135 to the position shown in Fig. 11, and to cause the dog 140 to move upwardly and the shoulder 143 to be located above the arm 144 so as to engage arm 144 as shoulder 143 moves downwardly again. During the upward movement of dog 140 the surface 180 is urged against arm 144 by spring 142, and dog 140 will snap into the position shown in Fig. 11 when the shoulder 143 passes the arm 144. As evaporation continues in the evaporator, substantially all refrigerant will be withdrawn from the container 38. After this, the cooling unit will become warmer, and the temperature of the fluid within the thermostat tube 134 will likewise become warmer. When the temperature of the fluid within the thermostat tube 134 attains a certain value, the pressure thereof will expand the bellows 132. The expansion of the bellows will cause the lever 135 to move downwardly, carrying with it the dog 140,—the shoulder 143 of said dog engaging the arm 144, and after said bellows has expanded to a certain extent the arm 144 will have moved sufficiently to cause the arm 169, and likewise the baffle 170, to assume the position shown in Fig. 9, in which position the water is again directed to the compartment 73 to again start the heating phase of the generator-absorber. Then the cycle of operation is repeated as often as necessary to maintain the desired average temperature in the brine tank.

After the lever 135 has been moved downwardly a distance sufficient to move the arm 144 in a position which will allow the spring 172 to move it and the baffle 170 into the position shown in Fig. 9, further downward movement of the lever 135 due to further expansion of the bellows 132 will cause the ear 181 of the dog to engage the frame member 131 and cause the upper portion of the dog to move into the position shown in Fig. 9, in which the shoulder 143 moves away from the operating arm 144, whereby said arm is free to be moved upwardly by the lever 159.

To conserve the supply of water during the cooling phase of the generator, the baffle 170 lies adjacent the nozzle 171 and restricts the flow of water therethrough, thus reducing the quantity of water consumed to what is necessary for the cooling of the generator.

The entire mechanism is mounted on the base 50 as a unit, and the cooling unit 37 is inserted through the opening 68 in the top wall of the cabinet 51, so that the cooling unit is located within the cooling compartment 183 of the cabinet 52,—the box-like structure closing the opening 68 resting upon the top of the cabinet. The refrigerating mechanism extending outside of the cabinet is covered by a hood 184.

During the heating phase of the generator-absorber 20, some absorbent is carried with the refrigerant into the dehydrator 27. A relatively large portion of the absorbent is condensed within the dehydrator and returns to the generator-absorber. It may happen that some absorbent escapes through the dehydrator and enters the container 38 of the unit 37. Therefore, it is necessary that means be provided for returning absorbent from the container 38 to the generator-absorber 20. In order to accomplish this, a tube 185 is suspended from the header 38 and is located adjacent the back end of the unit. The absorbent within the container 38 will seek the lowest level and, therefore, will pass into the tube 185. The conduit 47 extends through the header 38 and has its outlet end 48 located adjacent the bottom of tube 185, so that the absorbent will be forced upwardly within the conduit 47. The other end of the conduit 47 is connected with the valve 49 which includes a body 186 forming a chamber 187 having an outlet at its lower end connected by a pipe 188 with chamber 177 of non-return valve 43. The outlet of the valve 49 is controlled by a valve 189 which is carried by diaphragm 190. This diaphragm 190 is hermetically sealed to the body 186 and forms a top wall for the chamber 187. A plate 192 is secured to the body 186 and above the diaphragm 190 by screws, one of which is shown at 193. Plate 192 is recessed, as at 194, to receive a disc 195 for guiding the valve 189. The top wall of the recess also provides a stop for the disc 195 to limit the movement of the diaphragm. A button 196 is carried by the diaphragm 190 and extends upwardly through an opening 197 in the plate 192. Ears, one of which is shown at 198, are provided on the upper side of plate 192 and carry a pivot pin 199 upon which a lever 200 is pivotally mounted. The lower end of the body 186 carries an ear 202 provided with an opening adapted to receive a screw 203. A spring 204 is connected with a lever 200 and screw 203, and yieldingly forces the lever downwardly whereby said lever will engage the button 196 and tends to maintain the valve 189 in position to close the outlet to the chamber 187. The tension of the spring 204 can be regulated by a nut 205 on the screw 203.

During the heating phase of the generator-absorber, a relatively high pressure will be created in the container 38 which will cause the absorbent within the tube 185 to be forced upwardly into the chamber 187 of the valve 49. When the pressure within the system attains a relatively high value, the diaphragm 190 will be moved upwardly, forcing the valve 189 from its seat whereby the absorbent contained within the chamber 187 may pass therefrom and through the pipe 188 into the chamber 177 of the valve 143, whence it is conducted through the pipe 180, mercury 179, chamber 178, pipe 44 and into the generator 20.

Thus it will be observed that during each cycle of operation of the system, a predetermined quantity of liquid can be delivered from the evaporator container 38 to the generator-absorber; and the size of the mechanism is computed whereby sufficient liquid will be returned, which amount will include all of the absorbent and perhaps a small quantity of refrigerant. The front end of the header 38 has suspended therefrom adjacent the body thereof, a tube 207 which extends within the brine 39 in an angular direction, and is connected with the tube 185 adjacent the bottom thereof. The purpose of this tube is to conduct absorbent from the front end of the header and the purpose of the tube 185 is to conduct absorbent downwardly from the back end of the header. In this manner, if the cooling unit should not be placed in an exactly horizontal position, the absorbent will either flow through the tube 207 or the tube 185 to the inlet 48 of pipe 47. Tube 207 and fins 208 extending within the brine tank 39 readily conduct heat from the brine to the header 38.

While the form of embodiment of the invention as herein disclosed, constitutes a preferred form, it is to be understood that other forms might be adopted, all coming within the scope of the claims which follow.

What is claimed is as follows:

1. An absorption refrigerating system comprising, in combination, refrigerant generator and absorber means, a second means including condenser and evaporator mechanism operatively connected with the first means, means for intermittently heating and intermittently cooling said first means, said last means including a heating device and a cooling device, a movable member adapted when in one position to render the heating device inoperative and the cooling device operative and when in another position to render the cooling device inoperative and the heating device operative, a controller including mechanism responsive to the condition in the first means for moving the movable member to the first-named position and including a second mechanism for moving the movable member to its second-named position, and means responsive to the condition in the second-named means for operating said second mechanism to move said movable member and for disconnecting said second mechanism from the movable member.

2. An absorption refrigerating system comprising, in combination, refrigerant generator and absorber means, a second means including condenser and evaporator mechanism, means for heating the first means, means for cooling the first means, a fluid-circulating system including two receptacles, conduits connected with both receptacles, the heating means being rendered operable by fluid flowing in one of said conduits, the cooling means being rendered operable by fluid flowing in the other of said conduits, and means responsive to the condition of said first means for causing fluid to flow to one of the receptacles, and means responsive to the condition of the second means for causing fluid to flow to the other receptacle.

3. An absorption refrigerating system comprising, in combination, refrigerant generator and absorber means, a second means including condenser and evaporator mechanism, means for heating the first means, means for cooling the first means, a cooling-fluid-circulating system including a conduit for conducting cooling fluid adjacent said condensing mechanism both when the heating means and cooling means are operative, and means controlled by the condition within the refrigerating system for intermittently rendering the cooling device operative and for reducing the flow of cooling medium when the cooling device is rendered operative and for intermittently rendering the heating device operative and for increasing the flow of cooling medium when the heating device is rendered operative.

4. An absorption refrigerating system comprising, in combination, refrigerant generator and absorber means, a second means including condenser and evaporator mechanism, means for heating the first means, means for cooling the first means, a cooling-fluid-circulating system including a conduit for conducting cooling fluid adjacent the condenser mechanism, a second conduit connecting with said cooling means, a third conduit in parallel relation with the second conduit, said heating device being rendered operative when cooling fluid flows in said third conduit, means for causing cooling fluid to flow in said second and third conduits intermittently, and means for reducing the flow of cooling fluid in the circulating system when fluid flows in said second conduit.

5. An absorption refrigerating system comprising, in combination, refrigerant generator and absorber means, a second means including condenser and evaporator mechanism, means for heating the first means, means for cooling the first means, a cooling-fluid-circulating system including a conduit for conducting cooling fluid adjacent the condenser mechanism, a second conduit connecting with said cooling means, a third conduit in parallel relation with the second conduit, said heating device being rendered operative when cooling fluid flows in said third conduit, means for causing cooling fluid to flow in said second and third conduits intermittently, and means responsive to the condition within the refrigerating system for reducing the flow of cooling fluid in the circulating system when fluid flows in said second conduit.

6. An absorption refrigerating system comprising, in combination, refrigerant generator and absorber means, a second means including condenser and evaporator mechanism, means for heating the first means, means for cooling the first means, a cooling-fluid-circulating system including a conduit for conducting cooling fluid adjacent the condenser mechanism, a second conduit connecting with said cooling means, a third conduit in parallel relation with the second conduit, said heating device being rendered operative when cooling fluid flows in said third conduit, means responsive to the condition of the evaporator means for causing cooling fluid to flow in the third conduit, and means responsive to the condition of the first-named means for causing cooling fluid to flow in the second conduit and for reducing the flow of cooling fluid in the circulating system.

7. An absorption refrigerating system comprising, in combination, means including generator and absorber mechanism; a second means including condenser and evaporator mechanism operatively connected with the first means; a gas burner for heating the first means; a valve for controlling the flow of gas to said burner; and means for controlling the valve including a fluid-circulating system having parallel circuits, a movable fluid receptacle connected to the valve and adapted to receive fluid from only one of the circuits and having opening for draining fluid from the receptacle, said receptacle being arranged to move the valve to one position when it contains a predetermined quantity of fluid and to move the valve to another position when the quantity of fluid is reduced a predetermined amount; and means controlling the flow of fluid in said circuits.

8. An absorption refrigerating system comprising, in combination, means including generator and absorber mechanism; a second means including condenser and evaporator mechanism operatively connected with the first means; a gas burner for heating the first means; a valve for controlling the flow of gas to said burner; and means for controlling the valve including a fluid-circulating system having parallel circuits, a movable fluid receptacle adapted to receive fluid from one of said circuits and adapted to move to positively actuate said valve when fluid at a predetermined high level is contained therein, said receptacle having a drain opening below said level for draining said receptacle when fluid flows in the other circuit, and means for controlling the flow of fluid in said circuits.

9. An absorption refrigerating system comprising, in combination, means including generator and absorber mechanism containing an absorbent, a second means including condenser and evaporator mechanism operatively connected with the first means, a conduit connected between the second means and the first means for returning absorbent from the second to the first means, and a valve in said conduit including a diaphragm controlling a valve opening and subjected to the pressure within the second means.

10. An absorption refrigerating system comprising, in combination, means including generator and absorber mechanism containing an absorbent, a second means including condenser and evaporator mechanism operatively connected with the first means, a conduit connected between the second means and the first means for returning absorbent from the second to the first means, and means responsive to the pressure in the second means for controlling the passage through said conduit.

11. An absorption refrigerating system, comprising, in combination, means including generator and absorber mechanism containing an absorbent, a second means including condenser and evaporator mechanism operatively connected with the first means, a conduit connected between the second means and the first means for returning absorbent from the second to the first means, and means in said conduit for controlling the flow of absorbent comprising a spring-loaded plunger for closing said conduit and a diaphragm exposed to the pressure of the second means for moving said plunger against the force of the spring to open the conduit.

12. Refrigerating apparatus comprising in combination a generator-absorber, a condenser, and an evaporator connected in an operative circuit; means for heating the generator-absorber; means for cooling the generator-absorber; a cooling fluid circulating system including a conduit for conducting cooling fluid in heat exchange relation with the condenser both when the heating means is operative and when the cooling means is operative; and control means for directing the circulation of cooling fluid into and out of heat exchange relation to the cooling means including a pair of open receptacles adapted to receive cooling fluid from said conduit, a second conduit connected to one of said receptacles for conducting cooling fluid in heat exchange relation to the cooling means, and means for directing the flow of cooling fluid from the first conduit into either of said receptacles, said last mentioned means being arranged to restrict the flow of cooling fluid when directed into the receptacle connected to said second mentioned conduit.

13. Refrigerating apparatus comprising in combination a generator-absorber, a condenser, and an evaporator connected in an operative circuit; means for heating the generator-absorber; means for cooling the generator-absorber; a cooling fluid circulating system including a conduit for conducting cooling fluid in heat exchange relation with the condenser both when the heating means is operative and when the cooling means is operative; and control means for directing the circulation of cooling fluid into and out of heat exchange relation to the cooling means including a pair of open receptacles adapted to receive cooling fluid from said conduit, a second conduit connected to one of said receptacles for conducting cooling fluid in heat exchange relation to the cooling means, and means operating in response to the condition of the refrigerating apparatus for directing the flow of cooling fluid from the first conduit into either of said receptacles, said last mentioned means being arranged to restrict the flow of cooling fluid when directed into the receptacle connected to said second mentioned conduit.

In testimony whereof I hereunto affix my signature.

HARRY B. HULL.